US012679019B2

(12) United States Patent
Fauchery et al.

(10) Patent No.: US 12,679,019 B2
(45) Date of Patent: Jul. 14, 2026

(54) METHOD OF MANUFACTURING A PART MADE OF COMPOSITE MATERIAL

(71) Applicant: SKF Aerospace France S.A.S, Perrigny (FR)

(72) Inventors: Florent Denis Fauchery, Montmeyran (FR); Florian Vincent Bardy, Perrigny (FR); Nicolas Gabriel Pierre Lebossé, Viry (FR); Eric Jean-Marie Deneux, Metz (FR)

(73) Assignee: SKF Aerospace France S.A.S, Perrigny (FR)

( * ) Notice: Subject to any disclaimer, the term of this patent is extended or adjusted under 35 U.S.C. 154(b) by 0 days.

(21) Appl. No.: 18/888,449

(22) Filed: Sep. 18, 2024

(65) Prior Publication Data

US 2025/0108553 A1      Apr. 3, 2025

(30) Foreign Application Priority Data

Sep. 29, 2023      (FR) .................................. FR2310406

(51) Int. Cl.
  B29C 53/56       (2006.01)
  B29C 53/00       (2006.01)
    (Continued)

(52) U.S. Cl.
  CPC .......... B29C 53/566 (2013.01); B29C 53/005 (2013.01); B29C 70/003 (2021.05);
    (Continued)

(58) Field of Classification Search
  CPC ....... B29C 70/32; B29C 70/86; B29C 70/342; B29C 70/16; B29C 70/06; B29C 70/04;
    (Continued)

(56) References Cited

U.S. PATENT DOCUMENTS 9,352,538 B1      5/2016  Olason et al.
2002/0011047 A1   1/2002  Obeshaw
          (Continued)

FOREIGN PATENT DOCUMENTS

EP       2906411 B1      7/2018
FR       2645070 A3  * 10/1990   ............. B29C 70/86
          (Continued)

OTHER PUBLICATIONS

Preliminary Search Report from the French Patent Office dated Apr. 12, 2024 in related French application No. FR2310406, including Search Report and Written Opinion.
Search Report from the British Patent Office dated Jan. 31, 2025 in related application No. GB2411248.4.

*Primary Examiner* — Cedrick S Williams
(74) *Attorney, Agent, or Firm* — J-TEK LAW PLLC; Scott T. Wakeman; Mark A. Ussai

(57)      ABSTRACT

A method for manufacturing a part made of composite material including a thermoplastic or thermosetting matrix reinforced with fibers includes the following steps: winding or depositing pre-impregnated fibers about a mandrel so as to form a preform, the fibers being formed of a thermoplastic or thermosetting material and being pre-impregnated with a thermoplastic or thermosetting matrix; winding a heat-shrinkable film around the preform; polymerizing the intermediate product obtained by winding the film about the preform at a polymerization temperature depending on the composite material used; and removing the heat-shrinkable film from the intermediate product so as to obtain a one-piece part made of composite material and including the mandrel.

8 Claims, 2 Drawing Sheets

(51) Int. Cl.

| | |
|---|---|
| B29C 70/00 | (2006.01) |
| B29C 70/34 | (2006.01) |
| *B29K 63/00* | (2006.01) |
| *B29K 307/04* | (2006.01) |
| *B29K 309/08* | (2006.01) |

(52) U.S. Cl.
CPC ........ *B29C 70/342* (2013.01); *B29K 2063/00* (2013.01); *B29K 2307/04* (2013.01); *B29K 2309/08* (2013.01)

(58) Field of Classification Search
CPC ....... B29C 70/003; B29C 70/00; B29C 53/00; B29C 53/52; B29C 53/566; B29C 43/10; B29C 43/12
See application file for complete search history.

(56) References Cited

U.S. PATENT DOCUMENTS

| | | | |
|---|---|---|---|
| 2005/0089707 A1 | 4/2005 | Obeshaw | |
| 2005/0196570 A1* | 9/2005 | Lindsay | ................. A63B 60/00 156/143 |
| 2015/0267739 A1 | 9/2015 | Boveroux et al. | |
| 2020/0062369 A1 | 2/2020 | Stewart | |

FOREIGN PATENT DOCUMENTS

| | | | |
|---|---|---|---|
| FR | 3053622 | A1 | 1/2018 |
| FR | 3053622 | B1 | 4/2019 |
| GB | 2260961 | A | 5/1993 |
| JP | 2014091260 | A | 5/2014 |
| WO | 0204198 | A1 | 1/2002 |
| WO | 2015124924 | A1 | 8/2015 |

* cited by examiner

METHOD OF MANUFACTURING A PART MADE OF COMPOSITE MATERIAL

CROSS-REFERENCE

This application claims priority to French patent application no. 2310406 filed on Sep. 29, 2023, the contents of which are fully incorporated herein by reference.

BACKGROUND OF THE INVENTION

The present invention relates to parts made of composite material, such as a connecting rod, and more particularly to a method for manufacturing a part made of composite material including a thermoplastic or thermosetting matrix reinforced with fibers.

A conventional means of manufacturing a connecting rod made of composite material is based on the manufacture of a preform with the aid of one or more tools, such as a metal mandrel and/or a mold.

For example, French patent publication no. 3 053 622 describes, for example, a method for manufacturing a connecting rod. The preform is produced by filament winding of pre-impregnated fibers around the mandrel, which are then cut to enable removal of the mandrel. Next, the preform is placed in a female mold and then shaped, followed by tensioning using a bladder placed inside the preform. After a polymerization step, the finished connecting rod is then obtained.

The use of tools, such as the mandrel or the mold, requires one or more steps for removal of these items. In particular, due to the shape of the connecting rod, the mandrel ends up being trapped inside the preform so as to require cutting of the preform for mandrel removal. The number and the nature of the steps arising from the use of these tools makes such a manufacturing method particularly difficult and expensive.

SUMMARY OF THE INVENTION

The present invention therefore aims to overcome these drawbacks and to propose a simple and inexpensive means for manufacturing a part made of composite material, such as a connecting rod. The present invention thus proposes a method for manufacturing a part made of composite material comprising a thermoplastic or thermosetting matrix reinforced with fibers.

The method further comprises the following successive steps:
- a) winding or depositing pre-impregnated fibers, so as to form a preform around a mandrel comprising a thermoplastic or thermosetting material, the fibers being pre-impregnated with a thermoplastic or thermosetting matrix;
- b) winding a heat-shrinkable film around the preform;
- c) polymerizing the intermediate product obtained at the end of step b) at a polymerization temperature that depends on the composite material used; and
- d) removing the heat-shrinkable film from the intermediate product so as to obtain the part made of composite material in one piece, which includes the mandrel.

The part made of composite material is thus obtained by a manufacturing method that is simple, comprising a limited number of steps, and inexpensive, not involving the use of tools that need to be removed.

To be specific, the part made of composite material obtained is formed directly of the mandrel and the preform.

Advantageously, the pre-impregnated fibers may be impregnated with a thermoplastic or thermosetting matrix, such as an epoxy resin, comprising carbon and/or glass fibers.

Advantageously, the material of the mandrel may be a composite material comprising a thermoplastic or thermosetting matrix reinforced with fibers.

According to one feature, a pressure may be applied inside the mandrel during one or more of the steps a), b) and c).

In one embodiment, the mandrel may include at least two independent parts that are assembled together before step a).

For example, the mandrel may comprise first and second forked parts assembled respectively to the first and second ends of a main tubular part.

The manufacturing method may further comprise the addition of at least one reinforcement, such as a patch, before step a), on the mandrel, preferably in a housing of the mandrel.

Preferably, a notch, such as a wing, is formed on the mandrel so as to make it easier to put the reinforcement, such as a patch, in place.

Advantageously, the material of the mandrel may comprise particles, such as fibers, having electrical conductivity properties and/or anti-corrosion properties.

Advantageously, the manufacturing method may comprise, prior to step a), the at least partial manufacture of the mandrel using one or more of the following techniques: extrusion, extrusion blow molding, injection molding, injection blow molding, blow molding, rotational molding, thermoforming, 3D printing, pultrusion or filament winding.

The invention also relates to a connecting rod made of composite material, characterized in that it is produced by implementing the manufacturing method described above.

BRIEF DESCRIPTION OF THE SEVERAL VIEWS OF THE DRAWINGS

Further aims, advantages and features will become clear from the description set out below, which is provided purely by way of illustration and with reference to the attached drawings, in which.

DETAILED DESCRIPTION OF THE INVENTION

Figure 1:
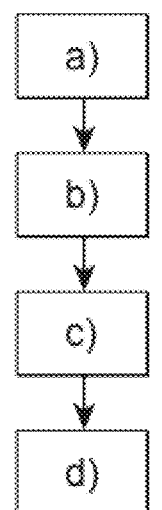
FIG. 1 is a flow chart showing the steps of a method for manufacturing a part made of composite material according to an exemplary embodiment of the invention.

With reference to FIG. 1, the invention relates to a method for manufacturing a part made of composite material.

Figure 2:
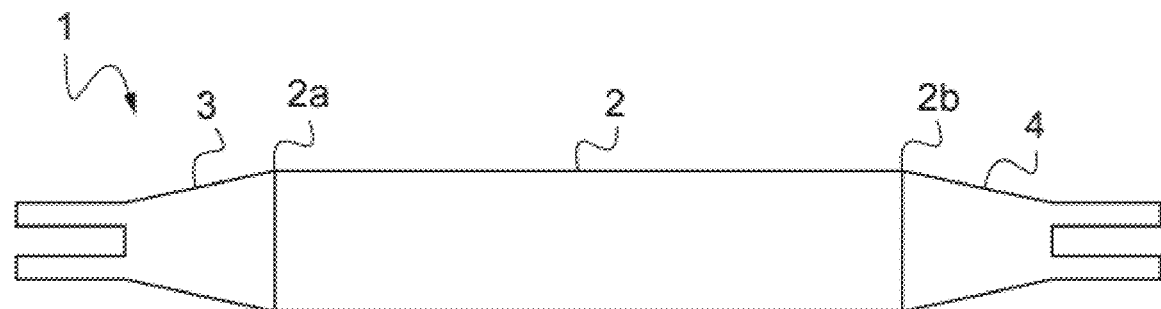
FIG. 2 shows a connecting rod according to another embodiment of the invention.

In the example shown in FIG. 2, the part made of composite material produced according to an exemplary embodiment of the manufacturing method according to the invention is a connecting rod 1. Alternatively, the method may be applied to the manufacture of other types of parts.

The connecting rod 1 shown includes a main tubular portion 2 having a first end 2a and an opposing, second end 2b, a first forked portion 3 extending from the first end 2a and a second forked portion 4 extending from the second end 2b.

The first and second forked portions 3, 4, respectively, are preferably yokes, each forked portion 3, 4 being intended to be attached to a separate tenon (not shown). Alternatively, the connecting rod 1 may have only a single forked portion.

Figure 3A:
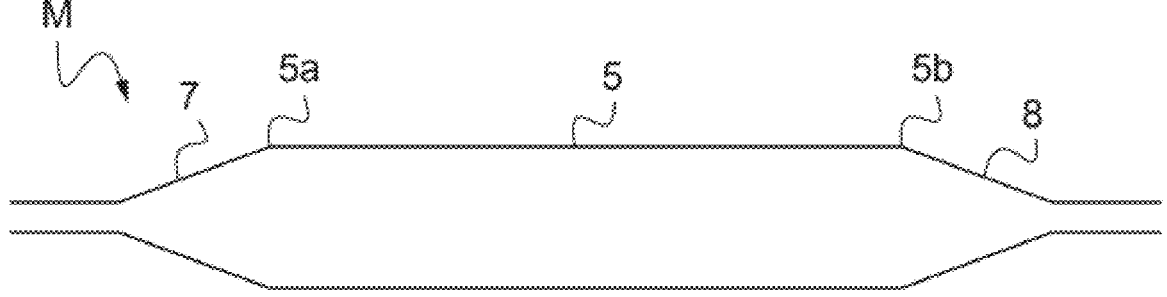
FIGS. 3a-3c are each a schematic view in longitudinal section of a connecting rod in various steps of its manufacture according to an exemplary embodiment of the manufacturing method of the invention.

With reference to FIG. 3a, the manufacturing method according to the present invention advantageously comprises providing a mandrel M formed of a thermoplastic material or of a thermosetting material. The thermoplastic or thermosetting material of the mandrel M is, for example, a resin. The material of the mandrel M may be a composite material comprising a thermoplastic matrix reinforced with fibers or a thermosetting matrix reinforced with fibers. The fibers reinforcing the thermoplastic or thermosetting matrix may be, for example, glass fibers and/or carbon fibers.

The mandrel M advantageously has, at least partially, a shape generally similar to the shape of the connecting rod 1 to be produced. In the depicted example, the mandrel M includes a tubular portion 5 having a first end 5a, an opposing second end 5b, a first forked portion 6 extending from the first end 5a and a second forked portion 7 extending from the second end 5b.

The particular shape of the mandrel M may be adapted to a desired shape of the connecting rod 1. For example, the mandrel M may have only a single forked portion.

Figure 3B:
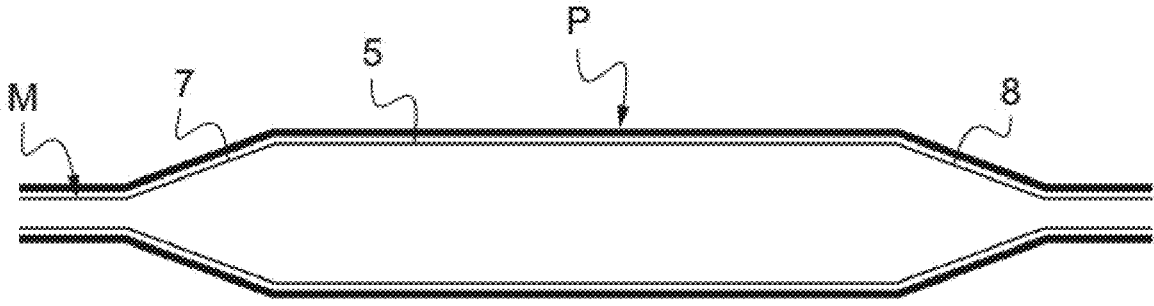

In a first or step a) of the manufacturing method, as shown in FIG. 3b, pre-impregnated fibers are wound or deposited so as to form a preform P around the mandrel M. Preferably, the preform P covers the entire outer surface of the mandrel M.

Preferably, the pre-impregnated fibers are fibers pre-impregnated using a thermoplastic matrix or a thermosetting matrix, for example an epoxy resin.

The preform P may be formed by deposition of pre-impregnated fibers in the form of a pre-impregnated sheet, known as a "prepreg", or in the form of a cut pre-impregnated sheet, known as a "slit tape". According to another alternative, the preform P may be formed by winding of a pre-impregnated fiber, known as a "towpreg".

Figure 3C:
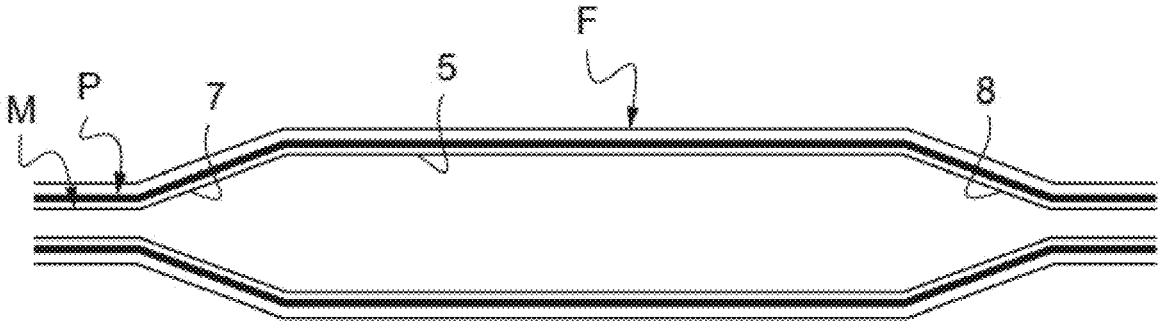

With reference to FIG. 3c, the manufacturing method then comprises, in a step b), winding a heat-shrinkable film F around the preform P, in contact with the preform P. Preferably, the heat-shrinkable film F covers the entire outer surface of the preform P.

As used herein, "heat-shrinkable film" means a film that can shrink under the effect of heat; in other words, a film that shrinks when heat is applied to the film.

In a subsequent step c), the thermoplastic matrix or the thermosetting matrix of the pre-impregnated fibers is polymerized.

To achieve polymerization, the assembly or intermediate product obtained at the end of step b), and formed or composed of the mandrel M, the preform P and the heat-shrinkable film F, is placed in an oven, under pressure and temperature conditions adapted to the nature of the thermoplastic or thermosetting matrix of the pre-impregnated fibers to be polymerized.

The heat-shrinkable film F, which shrinks under the effect of the heat applied during polymerization, creates a pressure on the preform P and compacts it against the mandrel M.

The material of the heat-shrinkable film F is preferably adapted as a function of the nature of the thermoplastic matrix or the thermosetting matrix of the pre-impregnated fibers, and in particular is adapted in such a way as to withstand the temperature of polymerization of the thermoplastic or thermosetting matrix of the pre-impregnated fibers. The heat-shrinkable film F is a plastic film, for example made of polyester.

After polymerization, the heat-shrinkable film F is removed in a step d), and the connecting rod 1 made of composite material is obtained.

The connecting rod 1 or other part made of composite material is thus obtained by a manufacturing method that is simple and quick and does not involve any tools or components that have to be removed.

The mandrel M made of thermoplastic material or thermosetting material, whether or not reinforced with fibers, forms an integral part of the connecting rod 1 obtained by the present manufacturing method, which makes it possible to produce the preform P without the necessity of removing the mandrel M. The connecting rod 1 made of composite material is formed of or includes the mandrel M and the preform P which, after the step c) of polymerization, form a one-piece part.

Preferably, the manufacturing method according to the present invention may comprise a step of applying a pressure inside the mandrel M. The pressure may be applied during one or more of the steps a), b) and c). Such a pressure may be, for example, between 3 bar (300 kilopascals) and 6 bar (600 kilopascals), and makes it possible to reinforce the compacting of the preform P.

Such a pressure also enables optimization of the tensioning of the preform P, preventing the preform P from being crushed or deformed under the effect of the tension due to the filament winding.

In one embodiment, the material of the mandrel M may include particles, such as fibers, having electrical conductivity properties and/or anti-corrosion properties.

For example, the mandrel M may be made of composite material comprising a thermoplastic matrix or a thermosetting matrix incorporating carbon or metal fibers, for example copper fibers for electrical conductivity or glass fibers for an anti-corrosion effect, in particular anti-galvanic corrosion effect.

According to one feature, the manufacturing method according to the invention may further comprise, prior to step a), a step of at least partially manufacturing or forming the mandrel M. Specifically, the mandrel M may be manufactured/formed using one or more of the following techniques: extrusion, extrusion blow molding, injection molding, injection blow molding, blow molding, rotational molding, thermoforming, 3D printing, pultrusion and filament winding.

"At least partially" means the manufacture or forming of a portion or a part of the mandrel M or of the entire mandrel M by one of these techniques: extrusion, extrusion blow molding, injection molding, injection blow molding, blow molding, rotational molding, thermoforming, 3D printing, pultrusion or filament winding.

Preferably, the mandrel M provided for use in step a) of the present method has a shape that is close to or similar to the shape of the connecting rod 1 to be produced so as to eliminate the need to machine the part made by the present method in order to attain a desired final shape of the connecting rod 1.

In the embodiment shown in FIG. 3a, the mandrel M is of one piece. Alternatively, the mandrel M may be formed of two or more separate parts that are assembled together.

Figure 4:
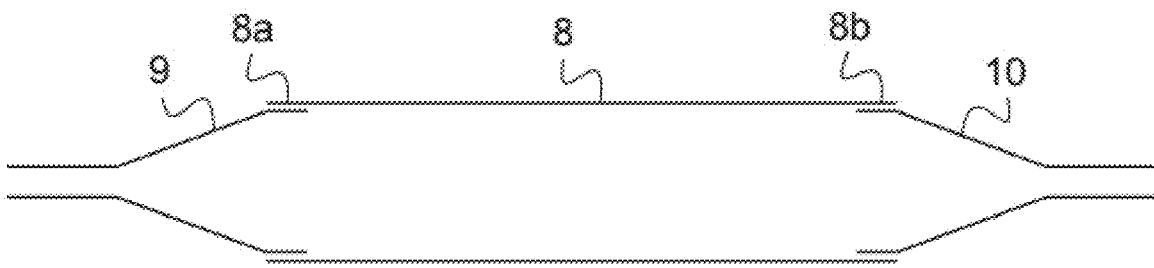
FIG. 4 is a schematic view in longitudinal section of a mandrel according to another embodiment of the invention.

In the example shown in FIG. 4, the mandrel M includes a tubular part 8 having first end 8a and an opposing second end 8b. The mandrel M also includes a first forked part 9 assembled to the first end 8 of the tubular part 8 and a second forked part 9 assembled to the second end 8b of the tubular part 8.

As an alternative, the mandrel M may include only a single forked part assembled to the tubular portion 8 (alternative not shown).

The assembly of several parts so as to form the mandrel M makes it possible to use several manufacturing techniques depending on the shape and the nature of the material of each part of the mandrel M.

The assembly enables adaptation of the nature of the material of each part according to its location on the mandrel M and the mechanical properties it must have. This makes it possible to reduce the cost of manufacturing the mandrel M and to reduce its overall weight.

Furthermore, assembly also allows direct manufacture of complex parts, such as the forked parts 9 and 10, without the necessity of machining these parts.

Moreover, a specific tubular part 8 may be assembled to various different forked parts, and vice versa.

In the example shown in FIG. 4, due to their complex shape, the two forked parts 9, 10 may be produced, for example, by injection molding, whereas the tubular part 8 may be produced, for example, by extrusion, pultrusion or filament winding.

Preferably, a one-piece mandrel M, such as shown in FIG. 3a, is produced by blow molding, which is a simple and inexpensive technique and allows the mandrel M to be easily manufactured on an industrial scale.

The manufacturing method according to the invention may comprise, in one embodiment, the addition of at least one reinforcement, such as a patch, on the mandrel M.

Preferably, one or more reinforcements may be added onto various areas of the mandrel M, before the winding or the deposition of the pre-impregnated fibers on the mandrel M, or on the preform P.

The position or location of the reinforcements on the mandrel M may be determined by the desired advantage to be achieved. In particular, these local reinforcements may be deposited directly on the mandrel M and/or on the preform P as the preform P is wound on the mandrel M. A function of mechanical reinforcement may be achieved by alternating winding of the preform P and deposition of the reinforcement.

The reinforcements allow local reinforcement, in particular mechanical, of certain areas of the mandrel M which may need to have greater mechanical properties, such as higher compressive strength.

According to another example, a function of control over galvanic corrosion may be obtained by directly depositing reinforcements with anti-galvanic corrosion properties on the mandrel M.

Preferably, the reinforcements are made of a material that is identical to that constituting the preform P. A reinforcement may be made up of a stack of such material so as to form a patch.

The preform P may be positioned in such a way as to overlap at least one end of the reinforcement.

Preferably, the mandrel M may include one or more housing(s) intended to receive the reinforcements, such that the shape of the mandrel M used in step a) is advantageously appropriate for forming complex areas and such that it can be functionalized without it being necessary to carry out shaping and machining of the part obtained at the end of step d).

Figure 5:
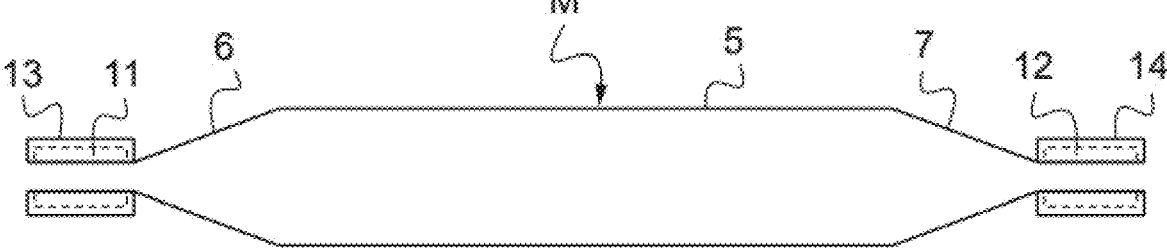
FIG. 5 shows patches being put in place during a method for manufacturing a connecting rod according to another exemplary embodiment of the invention.

In the example shown in FIG. 5, a first patch 11 is positioned on a forked portion 6 and a second patch 12 is positioned on a forked portion 7 of a one-piece mandrel M.

Preferably, and as also shown in FIG. 5, a first wing 13 is formed on the forked portion 6 of the mandrel M and a second wing 14 is formed on the forked portion 7 of the mandrel M, the wings 13, 14 forming two housings for retaining in place the patches 11, 12, respectively.

Placing such local reinforcements on the mandrel M before steps b) and c) enables the production of complex portions of the mandrel M and to eliminate the need to machine the part after polymerization.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A method for manufacturing a part formed of composite material including a thermoplastic or thermosetting matrix reinforced with fibers, the method comprising the steps of:
   winding or depositing pre-impregnated fibers about a mandrel so as to form a preform, the pre-impregnated fibers being pre-impregnated with a thermoplastic matrix or a thermosetting matrix and the mandrel being formed of a thermoplastic material or a thermosetting material;
   winding a heat-shrinkable film around the preform;
   polymerizing an intermediate product including the preform and the heat-shrinkable film at a temperature of polymerization of the thermoplastic material or the thermosetting material of the preform; and
   removing the heat-shrinkable film from the intermediate product so as to obtain a one-piece part including the composite material and the mandrel;
   wherein the mandrel includes a main tubular part with a first end and a second end and at least one forked part assembled to the first end of the main tubular part or to the second end of the main tubular part;

further comprising a step of adding at least one reinforcement patch only around the at least one forked part before the step of winding or depositing pre-impregnated fibers around the mandrel.

2. The manufacturing method according to claim 1, wherein the mandrel is formed of a composite material including a thermoplastic matrix reinforced with fibers or a thermosetting matrix reinforced with fibers.

3. The manufacturing method according to claim 1, wherein a pressure is applied inside the mandrel during the step of winding or depositing pre-impregnated fibers about the mandrel, the step of winding a heat-shrinkable film around the preform and/or the step of polymerizing the intermediate product.

4. The manufacturing method according to claim 1, wherein the material of the mandrel includes particles having electrical conductivity properties and/or anti-corrosion properties.

5. The manufacturing method according to claim 1, further comprising a step of at least partially forming the mandrel before the step of winding the fibers about the mandrel by one or more of the following techniques: extrusion, extrusion blow molding, injection molding, injection blow molding, blow molding, rotational molding, thermoforming, 3D printing, pultrusion and filament winding.

6. A connecting rod formed of a composite material and produced by the manufacturing method according to claim 1.

7. The manufacturing method according to claim 1, wherein the pre-impregnated fibers include carbon fibers and/or glass fibers.

8. The manufacturing method according to claim 7, wherein the thermoplastic matrix or the thermosetting matrix of the pre-impregnated fibers is an epoxy resin.

*    *    *    *    *